United States Patent
Lu

(10) Patent No.: US 9,779,387 B2
(45) Date of Patent: Oct. 3, 2017

(54) BUSINESS-TO-BUSINESS DOCUMENT USER INTERFACE AND INTEGRATION DESIGN

(71) Applicant: Oracle International Corporation, Redwood Shores, CA (US)

(72) Inventor: Yong Lu, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 468 days.

(21) Appl. No.: 14/311,109

(22) Filed: Jun. 20, 2014

(65) Prior Publication Data

US 2015/0370460 A1  Dec. 24, 2015

(51) Int. Cl.
*G06F 3/048* (2013.01)
*G06Q 10/10* (2012.01)

(52) U.S. Cl.
CPC .................................. *G06Q 10/10* (2013.01)

(58) Field of Classification Search
CPC . G06F 3/048; G06F 7/06; G06F 17/30; G06F 3/04842; G06F 3/0482; G06F 3/04847; G06Q 10/00
See application file for complete search history.

(56) References Cited

U.S. PATENT DOCUMENTS

| | | | |
|---|---|---|---|
| 6,381,579 B1 * | 4/2002 | Gervais | G06Q 10/06311 |
| | | | 705/7.13 |
| 7,627,631 B2 | 12/2009 | Blevins | |
| 8,046,441 B2 | 10/2011 | Banerji | |
| 8,095,497 B2 * | 1/2012 | O'Brien | G06Q 10/087 |
| | | | 707/769 |
| 8,112,382 B2 * | 2/2012 | O'Brien | G06Q 10/087 |
| | | | 707/769 |
| 8,533,661 B2 | 9/2013 | Nucci et al. | |
| 2002/0184145 A1 * | 12/2002 | Sijacic | G06Q 30/04 |
| | | | 705/40 |

(Continued)

OTHER PUBLICATIONS

B2B—Trading Partner Management (TPM); obtained at http://www.sdn.sap.com/irj/scn/go/portal/prtroot/docs/library/uuid/70823a9f-fa6b-3110-bf81-84e3f810de59?QuickLink=index&overridelayout=true&59064390320514; 48 pages; Jan. 2014.

(Continued)

*Primary Examiner* — Rashawn Tillery
(74) *Attorney, Agent, or Firm* — Trelllis IP Law Group, PC

(57) ABSTRACT

Dynamic user interfaces for displaying and optionally modifying and/or overriding B2B parameter values in electronic B2B documents are generated based on the B2B standards, parameter names, and values defined for specific B2B electronic documents. An electronic document is selected and a document parameter data structure is accessed to identify associated document parameter values and application attributes. An attribute data structure is then accessed to identify document parameter names corresponding with these parameter values. The application attributes link document parameter values for a B2B document with document parameter names based on the B2B document's associated standard or protocol. A document parameter override data structure may optionally include document parameter override values for an electronic document that replace the document parameter values for specific B2B transactions. The dynamic user interface may optionally arrange all of the user interface elements for a selected B2B document on a single page.

20 Claims, 7 Drawing Sheets

(56) References Cited

U.S. PATENT DOCUMENTS

| | | | |
|---|---|---|---|
| 2003/0130990 A1* | 7/2003 | Brown | G06F 17/211 |
| 2004/0176968 A1 | 9/2004 | Syed | |
| 2005/0234859 A1* | 10/2005 | Ebata | G06F 21/6218 |
| 2008/0059945 A1* | 3/2008 | Sauer | G06Q 10/10 |
| | | | 717/105 |
| 2008/0195649 A1* | 8/2008 | Lefebvre | G06F 17/3056 |
| 2010/0083171 A1* | 4/2010 | Begue | G06Q 30/06 |
| | | | 715/810 |
| 2012/0324069 A1 | 12/2012 | Nori et al. | |
| 2013/0085958 A1* | 4/2013 | Beck | G06Q 10/00 |
| | | | 705/342 |
| 2013/0304769 A1* | 11/2013 | Nicola | G06F 17/2247 |
| | | | 707/803 |

OTHER PUBLICATIONS

Understanding the webMethods Product Suite; obtained at http://documentation.softwareag.com/webmethods/wmsuites/wmsuite8_ga/Cross_Product/8-0_Understanding_webMethods_Product_Suite.pdf; 86 pages; Jan. 2010.

Building B2B Integrations; obtained at http://documentation.softwareag.com/webmethods/wmsuites/wmsuite8_ga/Trading_Networks/8-0-SP1_Trading_Networks_Administrators_Guide.pdf; 250 pages; May 2010.

Trading Partner Agreement; obtained at http://msdn.microsoft.com/en-us/library/ee920494.aspx; 2 pages; copyright 2010.

Protocol Settings; obtained at http://msdn.microsoft.com/en-us/library/ee920491.aspx; 2 pages; Mar. 20, 2014.

Covast B2B Suite for Energy and Utility; obtained at http://www.covast.com/library/Covast_EUbrochure.pdf; 5 pages; 2006 copyright.

B2B Protocol Specification by Example Using ESDL and ebXML; obtained at http://citeseerx.ist.psu.edu/viewdoc/download?doi=10.1.1.195.1957&rep=rep1&type=pdf; 23 pages; downloaded via circa Mar. 21, 2014.

Using AS2 and the AS2 Edition; obtained at http://public.dhe.ibm.com/software/commerce/doc/sb2bi/v5r2/Stds801_UsingAS2_book.pdf; 102 pages; copyright 2014.

IwayTrading Partner Manager; obtained at http://www.informationbuilders.com/products/iwaytradingmanager; 2 pages; downloaded via circa Mar. 19, 2014.

Informatica B2B Data Exchange; obtained at http://www.informatica.com/Images/06823_b2b-data-exchange_ds_en-US.pdf; 4 pages, copyright 2013.

Trading Partner Management; obtained at http://www.adeptia.com/products/trading-partner-management.html; 1 page; downloaded via circa Mar. 21, 2014.

TIBCO BusinessConnect concepts; obtained at https://docs.tibco.com/pub/businessconnect/6.0.1-may-2012/doc/bcis/pdf/tib_bc_concepts.pdf; 115 pages; Nov. 2011.

* cited by examiner

B2B ATTRIBUTE TABLE 100

| Name | EDI_X12 | EDI_EDIFACT | RosettaNet | OAG |
|---|---|---|---|---|
| Attribute1 | InterchangeAuthorizationInfo | UNACreation | | |
| Attribute2 | InterchangeAuthorizationInfoQual  115A | CharSet  115B | 115C | 115D |
| Attribute3 | InterchangeSecurityInfo | InterchangeRecipientRefPassword | | |
| Attribute4 | InterchangeSecurityInfoQual | InterchangeRecipientRefPasswordQual | | |
| Attribute5 | | | FromRole | AuthId |

FIG. 1A

B2B DOCUMENT PARAMETER TABLE 125

| Doc_ID | Doc_Protocol | Doc_Name | Attribute1 | Attribute2 | Attribute3 | Attribute... | Attribute55 |
|---|---|---|---|---|---|---|---|
| | EDI_X12 | | Value_x | Value_Y | Value_xx | | Value_kk |
| | EDI_EDIFACT | | | | | | |
| | RosettaNet | | | | | | |

FIG. 1B

B2B DOCUMENT PARAMETER OVERRIDE TABLE 150

| Doc_ID | Doc_Protocol | Doc_Name | Attribute1 | Attribute 2 | Attribute 3 | Attribute ... | Attribute 55 |
|---|---|---|---|---|---|---|---|
| | EDI_X12 | | Override_Value_x | | | | Value_kk |
| | EDI_EDIFACT | | | | | | |
| | RosettaNet | | | | | | |

DocumentProtocolVersion Level Parameters

| | | |
|---|---|---|
| 405A — UNACreation | always — 405B | |
| 410A — CharSet | UNOC — 410B | |
| InterchangeRecipientRefPassword | | |
| InterchangeRecipientRefPasswordQual | | |
| InterchangeServiceCodeList | | |
| InterchangeControlVersion | 3 | |
| InterchangeCharacterEncoding | | |
| InterchangeEDIFileBlob | edifact_d97a_UNB_Envelope_v83.ecs | |
| InterchangeApplicationRef | | |
| InterchangeProcessingPriority | | |
| InterchangeAgreementIdentifier | | |
| InterchangeTestIndicator | | |
| FunctionalGroupCreation | FALSE | |
| GroupAgencyCode | UN | |
| GroupAssociationCode | | |

EDI_EDIFACT

DocumentType Level Parameters

| | | |
|---|---|---|
| 455A — GroupID | DESADV — 455B | |
| 460A — TransactionControllingAgency | UN — 460B | |
| TransactionAssociationAssignedCode | | |
| TransactionCommonAccessRef | | |

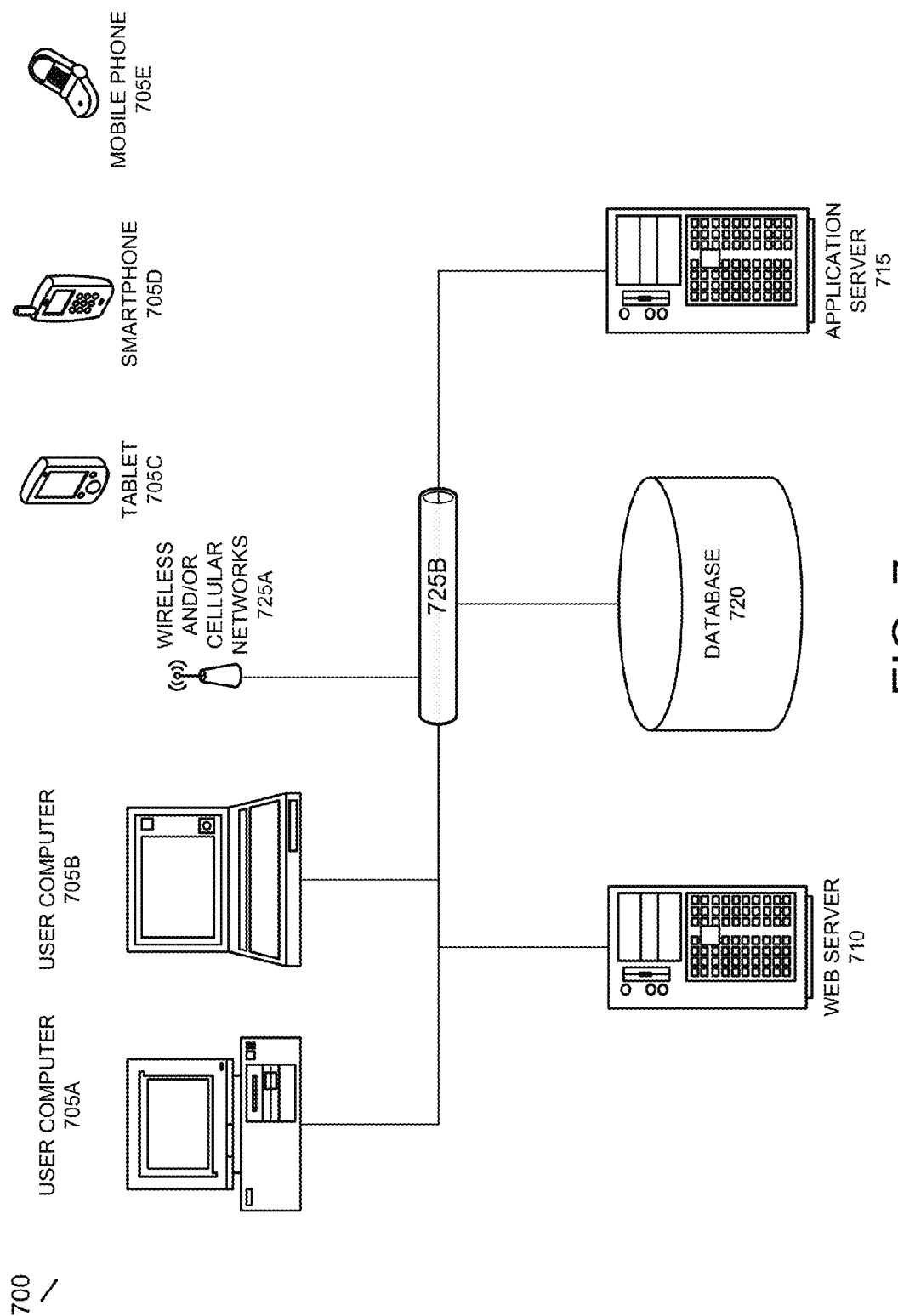

BUSINESS-TO-BUSINESS DOCUMENT USER INTERFACE AND INTEGRATION DESIGN

BACKGROUND

This application relates to the field of electronic document and data exchanges between different entities, and specifically to systems and methods for configuring electronic documents. Electronic document standards and associated communication protocols have been developed to provide businesses and other entities with secure and reliable systems for exchanging information, conducting transactions, and automating many business processes. In this application, electronic documents or other types of data that utilize these electronic document standards and/or protocols are referred to generally as business-to-business (B2B) documents, although embodiments of the invention are not limited to business applications.

Although B2B documents provide many advantages to businesses, creating, configuring, maintaining, and modifying B2B documents is complex and error-prone. For example, there are many different B2B protocols that may be used to communicate B2B. For each protocol, a given B2B document may have many different parameters. Furthermore, these B2B document parameters may have different valid values and/or need to be processed by B2B applications differently.

Because of this complexity, many prior B2B applications use hard-coded configurations of B2B document parameters and only allow internal administrators to access and/or modify B2B document parameters. B2B document parameter configurations are not open to outside business partners or end-users, so any changes to B2B document parameters in prior B2B applications require engineering and/or system administrator support. This greatly increases the time and expense required to create and modify B2B documents.

SUMMARY

Embodiments of the invention include systems and method of generating dynamic user interfaces based on the B2B standards and B2B parameter names and values defined for specific B2B electronic documents. An embodiment receives a selection of an electronic document and accesses a document parameter data structure to identify document parameter values and corresponding application attributes associated with the selected electronic document. The embodiment then accesses an attribute data structure to identify document parameter names corresponding with the electronic document parameter values using at least the application attributes. This embodiment then generates and displays a user interface including user interface elements based on the electronic document parameter names and values.

Embodiments of the invention may utilize the application attributes in the document parameter and attribute data structures to identify document parameter names matching document parameter values. Further embodiments of the invention may also utilize an electronic document standard or protocol associated with the selected electronic document to identify the document parameter name associated with an application attribute. An application attribute may be associated with different document parameter names for different electronic document standards and protocols.

In an additional embodiment, document parameter values that are undefined or absent from the document parameter data structure for a selected electronic document are omitted from the dynamic user interface for the selected electronic document.

In still another embodiment, a document parameter override data structure may optionally include one or more document parameter override values for a selected electronic document. The document parameter override values for a selected B2B document, if any, replace the document parameter values for one or more B2B transactions.

The dynamic user interface for a selected B2B document may include text boxes, text labels, drop-down lists, and form-filling user interface elements based on the document parameter names and values. The selected B2B document's user interface displays and optionally enables the modification and/or overriding of B2B document parameter values. In a further embodiment, the dynamic user interface may arrange all of the user interface elements for a selected B2B document on a single page.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIGS. 1A-1C illustrate example database tables used to store B2B application attributes, B2B protocol information, and B2B document parameters and parameter values according to an embodiment of the invention;

FIGS. 4A-4B illustrate a dynamic user interface for creating and modifying B2B document parameters using a first example B2B protocol according to an embodiment of the invention;

FIGS. 6A-6B illustrate a dynamic user interface for overriding B2B document parameters using a first example B2B protocol according to an embodiment of the invention; and FIG. 7 illustrates an example system suitable for implementing embodiments of the invention.

DETAILED DESCRIPTION OF EMBODIMENTS

Figure 2:
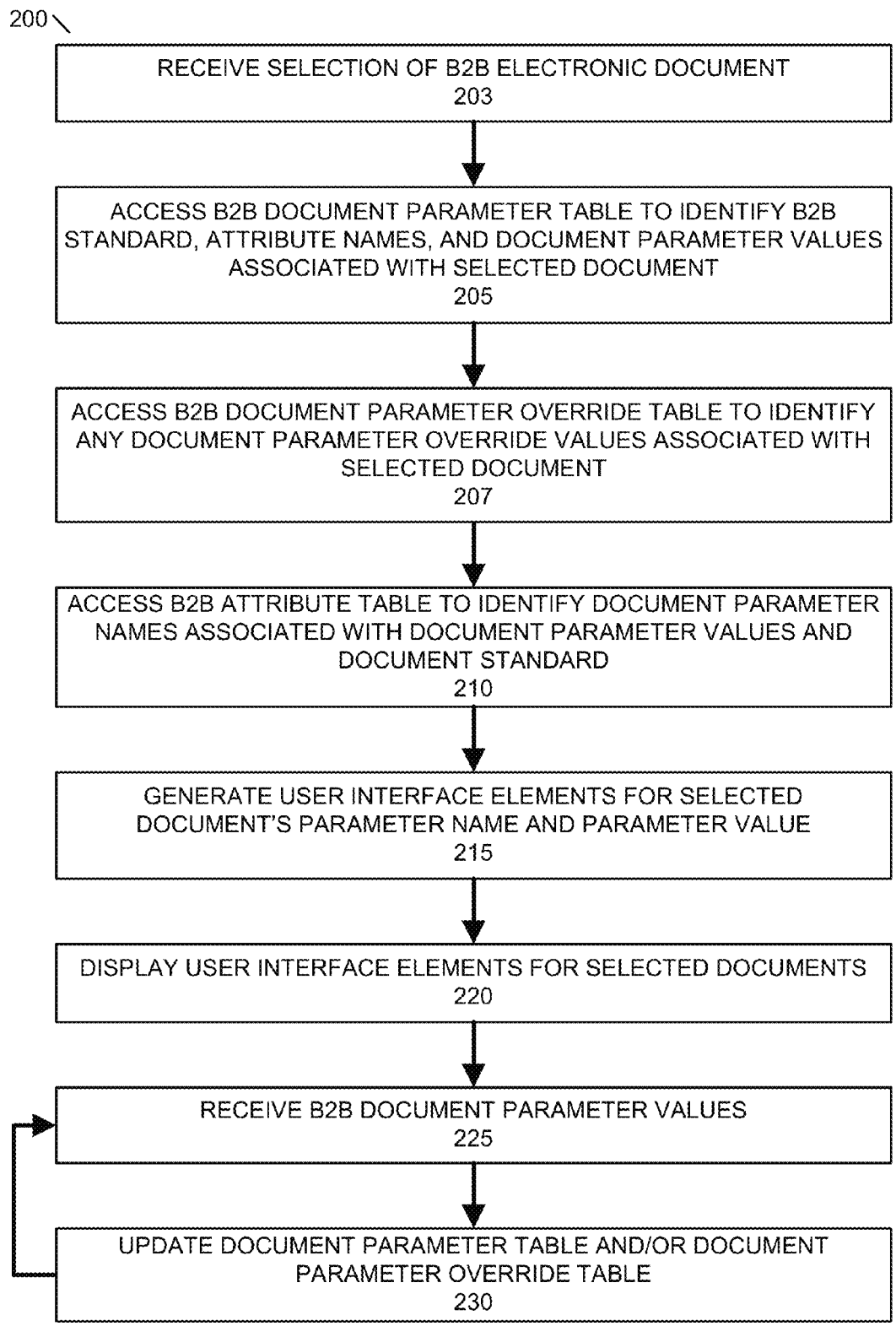
FIG. 2 illustrates a method of generating a dynamic user interface for creating and modifying B2B document parameters according to an embodiment of the invention.

FIGS. 1A-1C illustrate example database tables used to store B2B application attributes, B2B protocol information, and B2B document parameters and parameter values according to an embodiment of the invention. Although these tables are illustrated as database tables, embodiments of the invention may utilize other data structures or models to store and retrieve similar information.

FIG. 1A illustrates an example B2B attribute database table 100. As described in detail below, embodiments of the invention use the B2B attribute database table 100 to associate internal attributes in a B2B application with B2B protocols and B2B document parameters and parameter values.

Example B2B attribute table 100 includes a first column 103 specifying B2B application internal attribute names. One or more additional columns are each associated with a different B2B protocol and/or standard. For example, column 105 is associated with the EDI X12 (also known as ASC X12) standard, column 107 is associated with the EDIFACT (also known as UN/EDIFACT) standard, column 109 is associated with the RosettaNet standard, and column 111 is associated with the Open Applications Group (OAG) standard. Table 100 may include any number of columns in addition to the first column 103, enabling table 100 to support any arbitrary number of B2B protocols and/or standards.

Table 100 includes one or more rows, such as rows 113A-113E, that associate a B2B application internal attribute with B2B document parameter names for one or more protocols. For example, row 113B associates B2B application internal attribute 2 with the "InterchangeAuthorizationInfoQual" B2B document parameter 115A in the EDI X12 standard and with the "CharSet" B2B document parameter 115B in the EDIFACT standard. In some cases, B2B document parameter names associated with the same attribute may describe similar data or functionality. However, this is not required and the B2B document parameter names in different standards associated with the same attribute in table 100 may alternatively describe unrelated data or functionality, such as in the case of B2B document parameter names 115A and 115B.

Furthermore, some B2B application internal attributes may not be associated with any B2B parameter names for one or more standards. For example, table 100 includes empty cells 115C and 115D in row 113B, indicating that B2B application attribute 2 is not associated with any B2B parameter names for the RosettaNet and OAG standards.

FIG. 1B illustrates an example B2B document parameter table 125. B2B document parameter table 125 specifies the B2B protocol, document name, and one or more B2B parameter values for each B2B document recognized by the B2B applications. B2B document parameter table 125 includes column 127 specifying a document identifier for each B2B document. Column 131 includes a B2B document name value for each B2B document. Column 129 specifies the appropriate B2B standard for each B2B document. Valid values in column 129 correspond with the B2B standard columns in table 100 described above.

Table 125 also includes one or more additional columns, such as columns 133A-133E. Each one of these additional columns 133 represent one of the B2B application internal attributes. Typically, the number of these additional columns 133 in B2B document parameter table 125 is the same as the number of rows in B2B attribute table 100.

Table 125 includes one or more rows, such as rows 135, 137, and 139, with each row representing a different B2B document. For each row in B2B document parameter table 125, the value in each attribute column, if any, specifies the B2B document parameter value for the B2B document parameter associated with that attribute for that B2B standard.

For example, row 135 represents a B2B document having a document identifier specified in cell 135A, a document standard or protocol specified in cell 135B, and a document name specified in cell 135C. Additionally, this B2B document includes document parameter values in cells 135D, 135E, 135F, and 135H, corresponding with the B2B application attributes 1, 2, 3, and 55. B2B application attributes 1, 2, 3, and 55 are associated with B2B document parameter names using table 100. Cell 135E is empty, indicating that this B2B document does not utilize attribute 4 or its associated B2B parameter, if any.

In addition to specifying B2B document parameters and parameter values, embodiments of the invention may also enable users to override default B2B parameter values for specific B2B documents or instances of B2B documents. FIG. 1C illustrates an example B2B document parameter override table 150 according to an embodiment of the invention.

B2B document parameter override table 150 is structured similarly to the B2B document parameter table 150. B2B document parameter override table 150 specifies the B2B protocol, document name, and one or more B2B parameter values any B2B documents or document instances that need to have parameter values overridden from their default values. However, many B2B documents recognized by the B2B application and specified in B2B document parameter table 125 may not have corresponding entries in the B2B document parameter override table 150.

B2B document parameter override table 150 includes column 153 specifying a document identifier; column 157 includes a B2B document name value; and column 155 specifying the appropriate B2B standard. Override table 150 also includes one or more additional columns, such as columns 159A-159E. Each one of these columns 159 represent one of the B2B application internal attributes. Typically, the number of these additional columns 159 in B2B document parameter override table 150 is the same as the number of rows in B2B attribute table 100.

Override table 150 includes one or more rows, such as rows 161, 163, and 165, with each row representing a different B2B document. For each row in B2B document parameter override table 150, the value in each attribute column, if any, specifies the B2B document parameter override value for the B2B document parameter associated with that attribute for that B2B standard. Any B2B document parameter override values will override the corresponding document parameter value specified in B2B document parameter table 125.

For example, row 161 includes document parameter values in cells 161A and 161B, corresponding with the B2B application attributes 1 and 55. These document parameter override values will override the values for these attributes specified in B2B document parameter table 125. Because the other cells in row 161 of B2B document parameter override table 150 are empty, the other attributes of this B2B document will have the values specified by B2B document parameter table 125.

FIG. 2 illustrates a method 200 of generating a dynamic user interface for creating and modifying B2B document parameters according to an embodiment of the invention. Step 203 receives a selection of a B2B document from a user or B2B application.

Step 205 accesses a B2B document parameter table, such as that illustrated in FIG. 1B, to identify the B2B standard and/or protocol associated with the selected B2B document. Step 205 also identifies the B2B attributes and B2B document parameter values associated with the selected B2B document using the B2B document parameter table.

In an embodiment, step 205 selects a row of the B2B document parameter table having the document ID and/or document name matching the selected B2B document. Step 205 then examines the cell in each attribute column in this row for a B2B document parameter value. If the cell in an attribute column includes a B2B document parameter value, then step 205 adds this B2B document parameter value and associated B2B application internal attribute to a list of B2B document parameters and attributes. If the cell in an attribute column is empty, this indicates that this B2B document parameter is undefined or unused for the selected B2B document and, therefore, this attribute and B2B document parameter does not need to be added to the list.

Step 207 accesses the B2B document parameter override value table to retrieve document parameter values overriding the values from the B2B document parameter table. In an embodiment, step 207 is performed in a similar manner as step 205, with the parameter values in the B2B document parameter override table, if any, replacing corresponding parameter values from the B2B document parameter table.

Once steps 205 and 207 have identified the set of B2B document parameter values and corresponding B2B application internal attributes used by the selected B2B document, step 210 identifies the B2B document parameter names corresponding with these B2B document parameter values and attributes. In an embodiment, step 210 accesses the B2B attribute table to identify the B2B document parameter name associated with each B2B attribute identified in step 205.

For each B2B attribute in the list, an embodiment of step 210 first identifies the row of the B2B attribute table corresponding with this attribute. Next, step 210 identifies the column of the B2B attribute table corresponding with the standard and/or protocol used by the selected B2B document, as determined from the B2B document parameter table in step 205. The value of the cell in the B2B attribute table at this row and column intersection provides the B2B document parameter name associated with the B2B document parameter value retrieved in step 205. An embodiment of step 210 repeats this access procedure for all of the B2B attributes in the list to match B2B document parameter values with B2B document parameter names for the selected B2B document and its standard and/or protocol.

Step 215 generates user interface elements for each of the B2B document parameter names and values. In an embodiment, step 215 generates user interfaces elements for displaying B2B document parameter names and values. Additionally, an embodiment of step 215 generates user interface elements for optionally modifying and/or overriding one or more of the B2B document parameter values. Step 215 may utilize any user interface elements known in the art, including text boxes, text labels, drop-down lists, or other form-filling user interface elements.

Step 220 displays the user interface elements representing B2B document parameter names and values for the selected B2B document. In an embodiment, step 220 arranges the user interface elements so that all of the B2B document parameter names and values of the selected B2B document are displayed on a single page. This helps users easily understand and modify B2B document parameter values as needed.

In a further embodiment, optional step 225 receives one or more updated B2B document parameter values from a user via the displayed user interface elements. In response to receiving one or more updated B2B document parameter values, step 230 stores updated B2B parameter values in the B2B document parameter table or the B2B document parameter override table. In an embodiment, an additional user interface element allows the user to specify whether an updated B2B document parameter value replaces the existing B2B document parameter value or just overrides the B2B document parameter value for one or more specific B2B transactions. Steps 225 and 230 may be optionally repeated in response to receiving additional updated B2B document parameter values.

Figure 3:
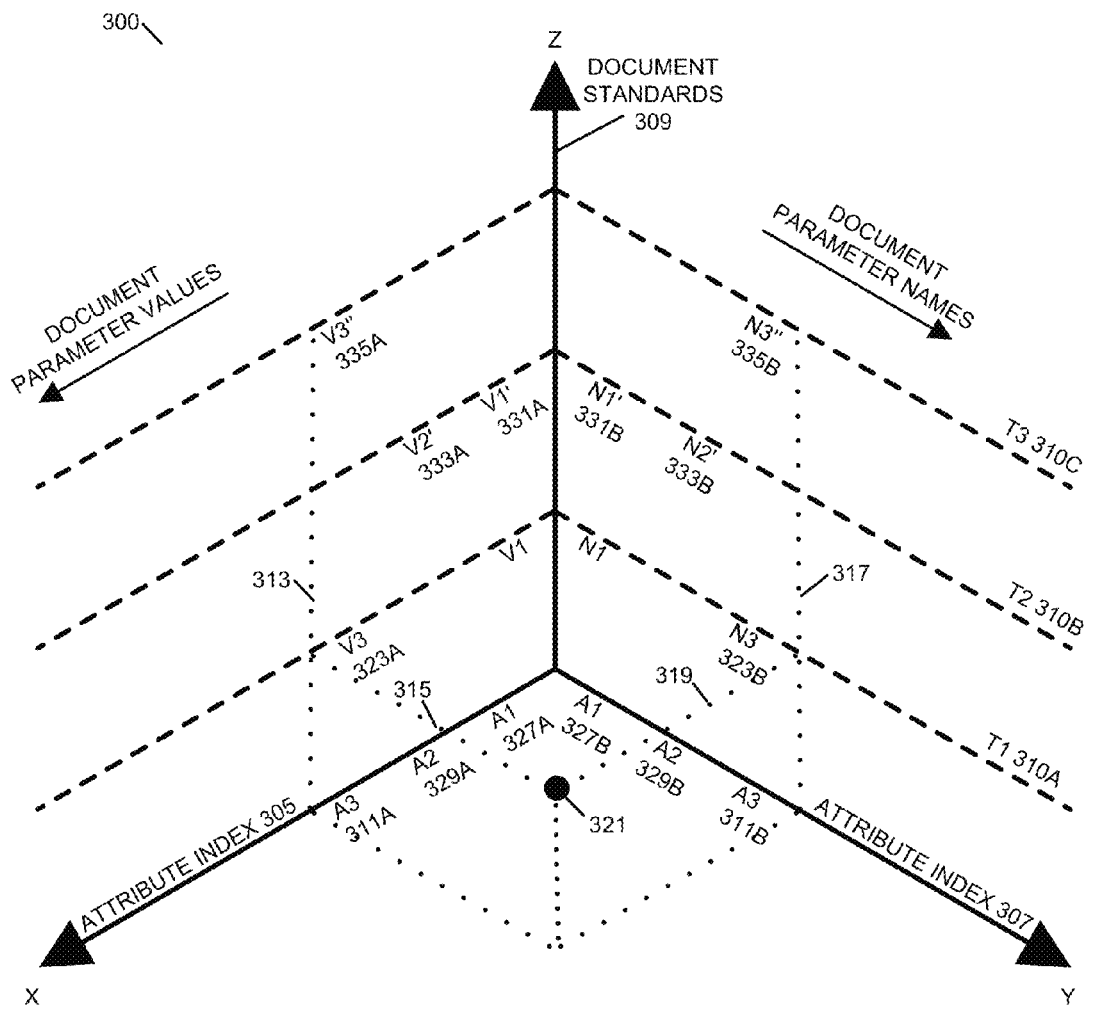
FIG. 3 illustrates an example of accessing B2B application attributes, B2B protocol information, and B2B document parameters and parameter values according to an embodiment of the invention.

FIG. 3 illustrates an example of accessing B2B application attributes, B2B protocol information, and B2B document parameters and parameter values according to an embodiment of the invention. FIG. 3 illustrates a diagram 300 of the B2B document parameter names, B2B document parameter values, B2B application attributes, and B2B standards and/or protocols arranged in three-dimensional space. In diagram 300, B2B application attributes are arranged along the X axis 305 and Y axis 307 of a coordinate system. Diagram 300 arranged B2B document standards and/or protocols along the Z axis 309.

To determine B2B document parameter names and values, as shown for example by method 200, an embodiment of the invention accesses a B2B document parameter table to identify document parameter values associated with a B2B application attribute. An example of this is illustrated in diagram 300 by line 313 intersecting attribute A3 311A on the X axis 305.

Additionally, an embodiment of the invention determines the B2B standard and/or protocol associated with a selected B2B document using the B2B document parameter table. This is illustrated in diagram 300 by the selection of a plane along the Z axis, such as planes 310A-310C. Each of these planes represents a different B2B standard and/or protocol. In this example, the B2B document parameter table specifies a B2B standard corresponding with plane T1 310A in diagram 300.

After identifying the B2B standard or protocol and B2B application attribute from the B2B parameter table, the intersection of line 313 and plane 310A in diagram 300 corresponds with the B2B document parameter value V3 323A.

Next, embodiments of the invention access the B2B attribute table to identify the B2B parameter name associated with this B2B parameter value using the same attribute and B2B standard. This is illustrated in diagram 300 by line 317 intersecting attribute A3 311B on the Y axis 307. The intersection of line 317 with plane 310A in diagram 300 is B2B document parameter name N3 323B. Thus, point 321 in diagram 300 represents the B2B document parameter name N3 323B and parameter value 323A.

As discussed above, it should be noted that some B2B document parameters names and values are not defined for specific B2B standards. This is illustrated by diagram 300 as well. For example, B2B standard T2, represented by plane 310B, includes B2B parameter values V1' 331A and V2' 333A and names N1' 331B and N2' 333B, corresponding with attributes A1 (327A and 327B) and A2 (329A and 329B). However, B2B standard T3, represented by plane 310C, does not include any B2B parameter values or names associated with attributes A1 and A2. Instead, B2B standard T3 only includes B2B parameter value V3" 335A and parameter name N3" 335B.

FIGS. 4A-4B illustrate a dynamic user interface for creating and modifying B2B document parameters using a first example B2B protocol according to an embodiment of the invention. In an embodiment, B2B documents may have parameters generally falling into one of three categories: protocol level parameters, document type parameters, and document definition level parameters. The example user interfaces of FIGS. 4A-4B are associated with a B2B document using the EDIFACT standard and protocol.

FIG. 4A illustrates an example dynamic user interface 400 for specifying B2B document protocol level parameters.

User interface 400 includes at least one user interface element for each B2B document parameter name and value defined for the selected B2B document. For example, user interface 400 includes user interface elements 405A and 405B displaying B2B document parameter name "UNACreation" and its associated B2B document parameter value of "always," respectively. Similarly, user interface 400 includes user interface elements 410A and 410B displaying B2B document parameter name "CharSet" and B2B document parameter value "UNOC," respectively. Because user interface is dynamically generated, for example using method 200, the number and identity of B2B document parameter names and values will vary depending on the B2B document selected.

As described above in method 200, dynamic user interfaces such as user interface 400 may include any user interface element types known in the art, including text boxes, text labels, drop-down lists, or other form-filling user interface elements. These user interface elements may be adapted to not only display B2B parameter values, but also to receive updated B2B parameter values from a user for storage in the B2B document parameter table or B2B document parameter override table.

FIG. 4B illustrates another example dynamic user interface 450 for specifying B2B document type level parameters. User interface 450 includes at least one user interface element for each B2B document parameter name and value defined for the selected B2B document, such as user interface elements 455A and 455B displaying B2B document parameter name "GroupID" and its associated B2B document parameter value of "DESADV," respectively. Similarly, user interface 450 includes user interface elements 460A and 460B displaying B2B document parameter name "TransactionControllingAgency" and B2B document parameter value "UN," respectively.

Because user interface 450 is dynamically generated, for example using method 200, the number and identity of B2B document parameter names and values will vary depending on the B2B document selected. In an embodiment, user interface elements for all of the B2B document parameter names and values associated with a selected B2B document are arranged and displayed in a single page, including protocol level parameters (such as shown in example user interface 400), document type level parameters, and document definition level parameters. In alternate embodiments, the user interface elements representing the complete set of B2B document parameter names and values for a selected B2B document may be arranged and displayed across multiple pages.

Figure 5A:
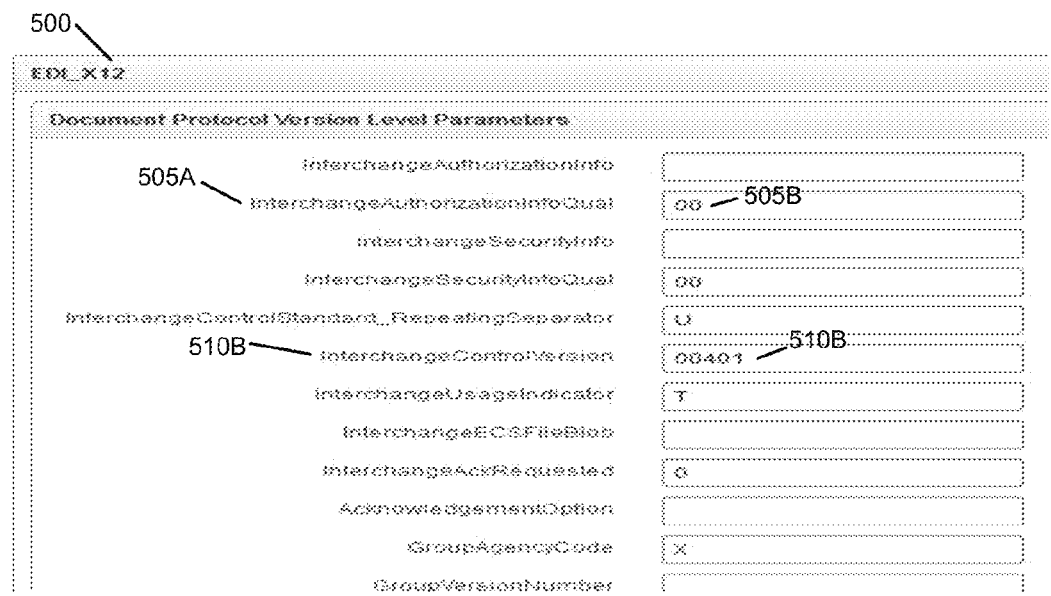
FIGS. 5A-5B illustrate a dynamic user interface for creating and modifying B2B document parameters using a second example B2B protocol according to an embodiment of the invention.
Figure 5B:
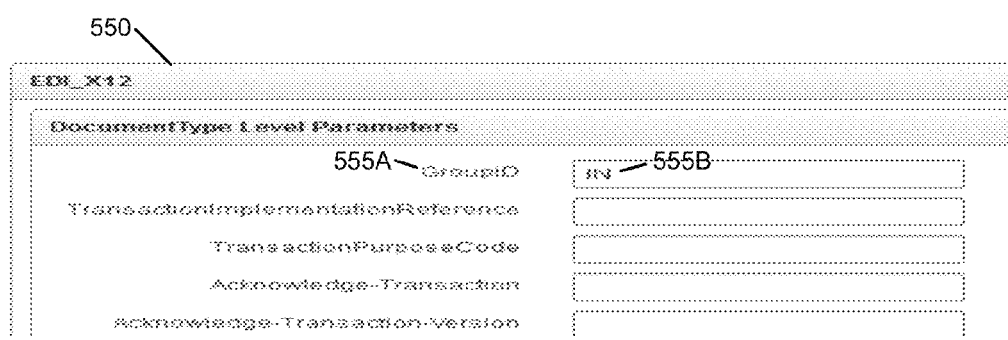

FIGS. 4A-4B illustrate example user interfaces for an example B2B document using the EDIFACT standard and protocol. Similar user interfaces may be dynamically created by embodiments of the invention for other B2B standards and/or protocols. FIGS. 5A-5B illustrate a dynamic user interface for creating and modifying B2B document parameters using a second example B2B protocol according to an embodiment of the invention. In this example, the selected B2B document is associated with the EDI X12 standard.

FIG. 5A illustrates an example dynamic user interface 500 for specifying B2B document protocol level parameters. Like the above example user interfaces, user interface 500 includes at least one user interface element for each B2B document parameter name and value defined for the selected B2B document, including user interface elements 505A and 505B displaying B2B document parameter name "InterchangeAuthorizationInfoQual" and its associated B2B document parameter value of "00," respectively. Similarly, user interface 500 includes user interface elements 510A and 510B displaying B2B document parameter name "InterchangeControlVersion" and B2B document parameter value "00401," respectively.

FIG. 5B illustrates another example dynamic user interface 550 for specifying B2B document type level parameters. User interface 550 includes at least one user interface element for each B2B document parameter name and value defined for the selected B2B document, such as user interface elements 555A and 555B displaying B2B document parameter name "GroupID" and its associated B2B document parameter value of "IN," respectively.

Because user interfaces 500 and 550 are dynamically generated, for example using method 200, the number and identity of B2B document parameter names and values will vary depending on the B2B document selected. Embodiments of the invention may arrange and display user interface elements for all of the B2B document parameter names and values associated with a selected B2B document in a single page or across multiple pages.

As described above in method 200, dynamic user interfaces such as user interfaces 500 and 550 may include any user interface element types known in the art, including text boxes, text labels, drop-down lists, or other form-filling user interface elements. These user interface elements may be adapted to not only display B2B parameter values, but also to receive updated B2B parameter values from a user for storage in the B2B document parameter table or B2B document parameter override table.

Figures 6A, 6B:
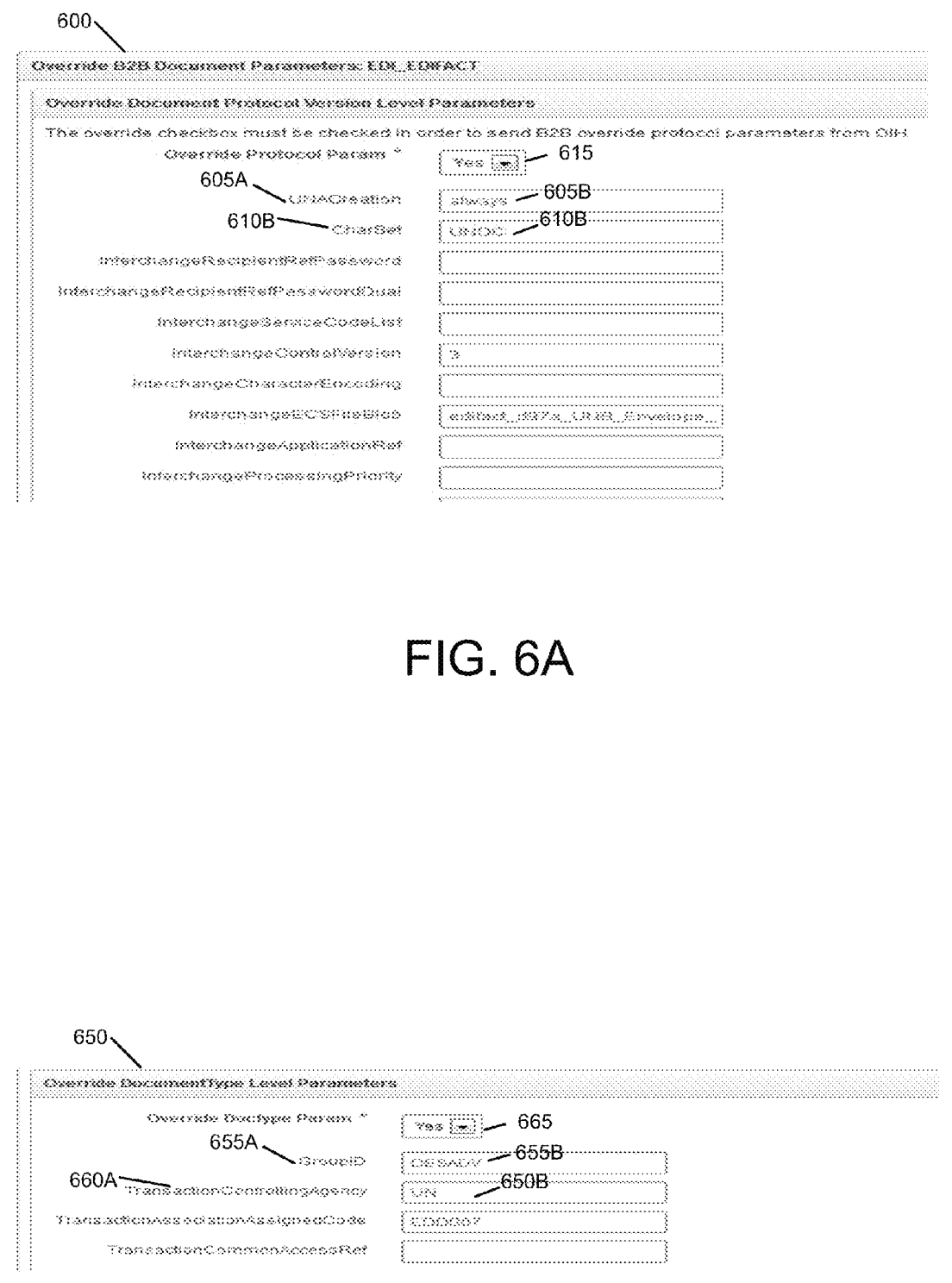

FIGS. 6A-6B illustrate a dynamic user interface for overriding B2B document parameters using a first example B2B protocol according to an embodiment of the invention. In this example, FIGS. 6A-6B illustrate user interfaces for an example B2B document using the EDIFACT standard and protocol.

FIG. 6A illustrates an example dynamic user interface 600 for overriding B2B document protocol level parameters. User interface 600 includes at least one user interface element for each B2B document parameter name and value defined for the selected B2B document. For example, user interface 600 includes user interface elements 605A and 605B displaying B2B document parameter name "UNACreation" and its associated B2B document parameter value of "always," respectively. Similarly, user interface 600 includes user interface elements 610A and 610B displaying B2B document parameter name "CharSet" and B2B document parameter value "UNOC," respectively.

Example user interface 600 enables users to override default B2B document parameter values with different values for a transaction. In an embodiment, the example user interface 600 displays the default B2B document parameter values, retrieved from the B2B document parameter table, if no override value have been specified in the B2B document parameter override value table. In a further embodiment, an override user interface element, such as dropdown box 615, allows a user to specify that the values entered into user interface 600 should be stored in the B2B document parameter override value table and used to override the default parameter values.

FIG. 6B illustrates another example dynamic user interface 650 for overriding B2B document type level parameters. User interface 650 includes at least one user interface element for each B2B document parameter name and value defined for the selected B2B document, such as user interface elements 655A and 655B displaying B2B document parameter name "GroupID" and its associated B2B document parameter value of "DESADV," respectively, and user interface elements 660A and 660B displaying B2B document parameter name "TransactionControllingAgency" and B2B document parameter value "UN," respectively. Like example user interface 600, example user interface 650 also includes an override user interface element 665. Override user interface element 665 allows a user to specify that the values entered into user interface 650 should be stored in the B2B document parameter override value table and used to override the default parameter values.

Because user interfaces 600 and 650 are dynamically generated, for example using method 200, the number and identity of B2B document parameter names and override values will vary depending on the B2B document selected. Embodiments of the invention may arrange and display user interface elements for all of the B2B document parameter names and override values associated with a selected B2B document in a single page or across multiple pages.

FIG. 7 illustrates an example system 700 suitable for implementing embodiments of the invention. Embodiments of the invention may be implemented as standalone applications or as web-based applications implemented using a combination of client-side and server-side code. FIG. 7 shows an example computer and network system architecture 700 suitable for implementing embodiments of the invention. The system includes user computers 705 including desktop 705A and portable personal computers 705B, tablets 705C, smartphones 705D, and mobile phones 705E. The system can interface with any type of electronic device, such as a thin-client computer, Internet-enabled mobile telephone, mobile Internet access device, tablet, electronic book, personal digital assistant, or wearable computer capable of displaying and navigating web pages or other types of electronic documents and/or executing applications. Although the system 700 is shown with five user computers, any number of user computers can be supported.

A web server 710 is used to process requests from web browsers and standalone applications for web pages, electronic documents, enterprise data or other content, and other data from the user computers. The server 710 may also provide the menu application, as well as syndicated content, such as RSS feeds, of data related to enterprise operations.

Application server 715 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 715 process input data and user computer requests and can store or retrieve data from database 720. Database 720 stores data created and used by the data applications. In an embodiment, the database 720 is a relational database that is adapted to store, update, and retrieve data in response to SQL format commands or other database query languages. In other embodiments, unstructured data storage architectures and NoSQL databases may also be used.

In an embodiment, the application server 715 is one or more general-purpose computers capable of executing programs or scripts. In an embodiment, the web server 710 is implemented as an application running on one or more general-purpose computers. The web server and application server may be combined and executed on the same computers.

An electronic communication network 725 enables communication between user computers 705, web server 710, application server 715, and database 720. In an embodiment, network 725 may further include any form of electrical or optical communication devices, including wireless 725A and wired 725B networks. Network 725 may also incorporate one or more local-area networks, such as an Ethernet network; wide-area networks, such as the Internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. Any suitable programming language can be used to implement the routines of particular embodiments. Any type of programming techniques may be employed including procedural, functional, and/or object oriented programming techniques. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a tangible, computer-readable storage medium for use by or in connection with the instruction execution system, apparatus, system, or device. Computer-readable storage mediums include, without limitation, volatile and non-volatile electronic memory devices, including static and dynamic RAM, ROM, EPROM, EEPROM, and flash memory; fixed and removable magnetic data storage media and devices; and optical storage media and devices. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method of generating a dynamic user interface for displaying electronic document parameters, the method comprising:
   receiving a selection of an electronic document;
   accessing an electronic document parameter data structure to identify electronic document parameter values and corresponding application attributes associated with the selected electronic document;
   accessing an attribute data structure to identify electronic document parameter names corresponding with the electronic document parameter values using at least the application attributes;
   generating for display a user interface including user interface elements based on the electronic document parameter names and values;
   receiving an update of a value for an attribute of the document from a user interface element of the user interface; and
   updating the document based on the received update of the value.

2. The method of claim 1, wherein the application attributes are associated with the electronic document parameter values in the electronic document parameter data structure and with the electronic document parameter names in the attribute data structure.

3. The method of claim 1, wherein accessing the attribute data structure includes identifying the electronic document parameter names using at least an electronic document standard associated with the selected electronic document in addition to the application attributes.

4. The method of claim 3, comprising:
   accessing the electronic document parameter data structure to determine the electronic document standard associated with the selected electronic document.

5. The method of 3, wherein the electronic document standard includes a B2B document standard including at least one B2B document communications protocol.

6. The method of claim 1, wherein accessing the electronic document parameter data structure to identify the electronic document parameter values and the corresponding application attributes comprises:
   for each application attribute included in the electronic document parameter data structure, determining if the electronic document parameter data structure includes a corresponding electronic document parameter value;
   in response to the determination that the electronic document parameter data structure includes the electronic document parameter value corresponding with the application attribute, identifying the electronic document parameter value and corresponding application attribute as associated with the selected electronic document; and
   in response to the determination that the electronic document parameter data structure does not includes the electronic document parameter value corresponding with the application attribute, omitting the electronic document parameter value and corresponding application attribute from the identified electronic document parameter values and application attributes associated with the selected electronic document.

7. The method of claim 1, wherein accessing the electronic document parameter data structure to identify the electronic document parameter values and the corresponding application attributes comprises:
   for each application attribute associated with the selected electronic document, accessing an electronic document parameter override data structure to determine if the electronic document parameter override data structure includes a corresponding electronic document parameter override value corresponding with the application attribute; and
   in response to the determination that the electronic document parameter override data structure includes the corresponding electronic document parameter override value, replacing the electronic document parameter value corresponding with the application attribute with the electronic document parameter override value.

8. The method of claim 1, wherein the user interface includes text boxes, text labels, drop-down lists, and form-filling user interface elements.

9. The method of claim 1, further comprising:
   receiving at least one modified electronic document parameter value via the user interface; and
   storing the modified electronic document parameter value.

10. The method of claim 9, wherein the modified electronic document parameter value is stored in the electronic document parameter data structure.

11. The method of claim 9, wherein the modified electronic document parameter value is stored in the electronic document parameter override data structure.

12. The method of claim 11, wherein the user interface includes an override user interface element enabling a user to specify that the modified electronic document parameter value should override the corresponding electronic document parameter value.

13. The method of claim 1, wherein the user interface includes the user interface elements arranged on a single page.

14. The method of claim 1, wherein the selected electronic document includes a B2B document.

15. The method of claim 1, wherein at least one of the electronic document parameter data structure and the attribute data structure includes a database table.

16. A tangible, computer-readable information storage medium including instructions adapted to direct a processor to perform an operation, the operation comprising:
   receiving a selection of an electronic document;
   accessing a electronic document parameter data structure to identify electronic document parameter values and corresponding application attributes associated with the selected electronic document;
   accessing an attribute data structure to identify electronic document parameter names corresponding with the electronic document parameter values using at least the application attributes;

generating for display a user interface including user interface elements based on the electronic document parameter names and values;

receiving an update of a value for an attribute of the document from a user interface element of the user interface; and updating the document based on the received update of the value.

17. The tangible, computer-readable information storage medium of claim 16, wherein the application attributes are associated with the electronic document parameter values in the electronic document parameter data structure and with the electronic document parameter names in the attribute data structure.

18. The tangible, computer-readable information storage medium of claim 16, wherein accessing the attribute data structure includes identifying the electronic document parameter names using at least an electronic document standard associated with the selected electronic document in addition to the application attributes.

19. The tangible, computer-readable information storage medium of claim 16, wherein accessing the electronic document parameter data structure to identify the electronic document parameter values and the corresponding application attributes comprises:

for each application attribute associated with the selected electronic document, accessing an electronic document parameter override data structure to determine if the electronic document parameter override data structure includes a corresponding electronic document parameter override value corresponding with the application attribute; and in response to the determination that the electronic document parameter override data structure includes the corresponding electronic document parameter override value, replacing the electronic document parameter value corresponding with the application attribute with the electronic document parameter override value.

20. An apparatus comprising:

an application server coupled with a database and a client system via at least one network, wherein the database stores data elements, wherein the application server is adapted to generate a user interface including user interface elements based on electronic document parameter names and values and communicate the user interface with the client system for display to a user;

wherein the application server includes a tangible, computer-readable information storage medium including instructions executable by the application server for:

receiving a selection of an electronic document;

accessing an electronic document parameter data structure to identify electronic document parameter values and corresponding application attributes associated with the selected electronic document;

accessing an attribute data structure to identify electronic document parameter names corresponding with the electronic document parameter values using at least the application attributes;

generating the user interface including user interface elements based on the electronic document parameter names and values;

receiving an update of a value for an attribute of the document from a user interface element of the user interface; and updating the document based on the received update of the value.

\* \* \* \* \*